(12) United States Patent
Venkataraman et al.

(10) Patent No.: US 10,198,498 B2
(45) Date of Patent: Feb. 5, 2019

(54) METHODS AND SYSTEMS FOR UPDATING DATABASE TAGS FOR MEDIA CONTENT

(71) Applicant: Rovi Guides, Inc., Santa Clara, CA (US)

(72) Inventors: Sashikumar Venkataraman, Andover, MA (US); Vineet Agarwal, Andover, MA (US); Ahmed Nizam Mohaideen P, Tamilnadu (IN)

(73) Assignee: Rovi Guides, Inc., San Jose, CA (US)

( * ) Notice: Subject to any disclaimer, the term of this patent is extended or adjusted under 35 U.S.C. 154(b) by 374 days.

(21) Appl. No.: 14/710,965

(22) Filed: May 13, 2015

(65) Prior Publication Data

US 2016/0335339 A1 Nov. 17, 2016

(51) Int. Cl.
*G06F 17/30* (2006.01)

(52) U.S. Cl.
CPC .. *G06F 17/30598* (2013.01); *G06F 17/30038* (2013.01); *G06F 17/3082* (2013.01); *G06F 17/3084* (2013.01); *G06F 17/30345* (2013.01); *G06F 17/30817* (2013.01); *G06F 17/30867* (2013.01)

(58) Field of Classification Search
CPC ............... G06F 17/30598; G06F 17/30372
See application file for complete search history.

(56) References Cited

U.S. PATENT DOCUMENTS

| | | | |
|---|---|---|---|
| 6,239,794 B1 | 5/2001 | Yuen | |
| 6,388,714 B1 | 5/2002 | Schein | |
| 6,564,378 B1 | 5/2003 | Satterfield | |
| 6,756,997 B1 | 6/2004 | Ward | |
| 7,043,473 B1* | 5/2006 | Rassool | ............ G06F 17/30743 |
| 7,165,098 B1 | 1/2007 | Boyer | |
| 7,761,892 B2 | 7/2010 | Ellis | |
| 8,046,801 B2 | 10/2011 | Ellis | |
| 8,296,295 B2 | 10/2012 | Barve | |
| 8,543,582 B1* | 9/2013 | Granstrom | ........ G06F 17/30038 705/319 |
| 9,600,231 B1* | 3/2017 | Sun | ......................... G06F 3/167 |
| 2002/0174430 A1 | 11/2002 | Ellis | |
| 2003/0105589 A1* | 6/2003 | Liu | ................... G06F 17/30017 702/1 |
| 2003/0110499 A1 | 6/2003 | Knudson | |
| 2005/0251827 A1 | 11/2005 | Ellis | |
| 2005/0289111 A1* | 12/2005 | Tribble | ............. G06F 17/30038 |
| 2008/0247608 A1* | 10/2008 | Vasilescu | ........... G06K 9/00275 382/118 |
| 2009/0307207 A1* | 12/2009 | Murray | ............. G06F 17/30026 |
| 2010/0153885 A1 | 6/2010 | Yates | |

(Continued)

OTHER PUBLICATIONS

International Search Report for International Application No. PCTUS2016/031596 dated May 10, 2016 (12 pages).

*Primary Examiner* — Usmaan Saeed
*Assistant Examiner* — David M Nafziger
(74) *Attorney, Agent, or Firm* — Haley Guiliano LLP

(57) ABSTRACT

Methods and systems for a media guidance application that can automatically, or with little human interaction, identify characteristics of media content (e.g., sub-genres, minor actors, etc.) and generate appropriate tags for that media content. The media guidance application can thus facilitate user searches based on specific and narrowly tailored search terms (e.g., sub-genres, minor actors, etc.).

18 Claims, 5 Drawing Sheets

(56) References Cited

U.S. PATENT DOCUMENTS

| | | | | |
|---|---|---|---|---|
| 2010/0257129 A1* | 10/2010 | Lyon | G06F 17/30743 | 706/12 |
| 2010/0268708 A1* | 10/2010 | Zhang | G06F 17/30663 | 707/726 |
| 2011/0258188 A1* | 10/2011 | AbdAlmageed | G06F 17/30796 | 707/736 |
| 2012/0042338 A1* | 2/2012 | Kitts | H04N 21/25866 | 725/35 |
| 2013/0036006 A1* | 2/2013 | Hefeeda | G06Q 30/02 | 705/14.49 |
| 2014/0040262 A1* | 2/2014 | Winter | G06F 17/30778 | 707/737 |
| 2014/0052717 A1* | 2/2014 | Franks | G06F 17/30817 | 707/723 |
| 2014/0143259 A1* | 5/2014 | Jain | G06F 17/30864 | 707/748 |
| 2015/0006528 A1* | 1/2015 | Rao | G06F 17/30705 | 707/730 |
| 2015/0066925 A1* | 3/2015 | Park | G06F 17/30598 | 707/737 |
| 2015/0100578 A1* | 4/2015 | Rosen | G06F 17/30598 | 707/737 |
| 2015/0186535 A1* | 7/2015 | Patil | G06F 17/30622 | 707/710 |
| 2015/0213492 A1* | 7/2015 | Aleksandrovsky | G06Q 30/0255 | 705/14.53 |
| 2015/0227634 A1* | 8/2015 | Wood | G06F 17/30247 | 707/722 |
| 2015/0302006 A1* | 10/2015 | Sasidharan | G06F 17/3002 | 707/741 |
| 2015/0319509 A1* | 11/2015 | Huang | H04N 21/4722 | 725/53 |
| 2015/0324459 A1* | 11/2015 | Chhichhia | G06N 7/02 | 706/12 |
| 2015/0341410 A1* | 11/2015 | Schrempp | H04L 65/4069 | 709/231 |
| 2015/0356152 A1* | 12/2015 | Tsuchida | G06F 17/30539 | 707/730 |
| 2016/0071182 A1* | 3/2016 | Nogues | G06Q 30/0631 | 705/26.7 |
| 2016/0140643 A1* | 5/2016 | Nice | G06Q 30/0631 | 705/26.7 |
| 2016/0335339 A1* | 11/2016 | Venkataraman | G06F 17/30038 | |
| 2017/0083620 A1* | 3/2017 | Chew | G06F 17/30719 | |
| 2017/0118496 A1* | 4/2017 | Redmond | H04L 12/185 | |

\* cited by examiner

METHODS AND SYSTEMS FOR UPDATING DATABASE TAGS FOR MEDIA CONTENT

BACKGROUND

In conventional systems, users typically have access to a plethora of media content. In fact, users have access to so much media content users often need help in navigating available media content and finding media assets for consumption. To alleviate such problems, conventional systems often allow users to search the available media content based on various criteria such as the cast and crew, genre, broadcast time, etc. While such a feature is helpful, it is also limited to the specificity with which a user may search. For example, while a user may search by the name of the lead actor to receive media asset listings featuring that actor, the user typically cannot search by an actor with a minor role. In another example, while a user may search a genre (e.g., "horror"), the user typically cannot search by a sub-genre (e.g., "slasher").

The limitation in terms by which a user may search is due to the lack of tags (e.g., descriptive metadata) that accompany media assets. For example, while tags for broad search categories may be automatically determined for individual media assets from published descriptions, more detailed tagging for use in allowing more detailed searches is not easily determinable. In fact, in many cases, detailed tagging (e.g., indicating a sub-genre or minor actor) must be done manually by a human operator, which is both time consuming and expensive.

SUMMARY

Accordingly, methods and systems are described herein for a media guidance application that can automatically, or with little human interaction, identify characteristics of media content (e.g., sub-genres, minor actors, etc.) and generate appropriate tags for that media content. The media guidance application can thus facilitate user searches based on specific and narrowly tailored search terms (e.g., sub-genres, minor actors, etc.).

To identify various characteristics of media content, the media guidance application may mine metadata, subtitles, closed captioning data, textual descriptions, etc., about a media asset. Furthermore, the media guidance application may perform various analyses on the mined data to identify characteristics about the media asset. These characteristics may then be compared to known characteristics of media assets associated with a selected tag. Based on the comparison, the media guidance application may determine whether or not to tag the media asset with the selected tag.

In some aspects, the media guidance application may select a media asset record from a first database, in which the first database lists a plurality of available media asset records. For example, the media guidance application may store a database that lists each available media asset as well as the various characteristics and/or tags associated with a particular media asset.

The media guidance application may process the selected media asset record to determine a plurality of keywords corresponding to a selected media asset record. For example, the media guidance application may analyze the subtitles or textual descriptions associated with a given media asset to determine keywords associated with the media asset.

The media guidance application may then store a plurality of keyword vectors in a second database, in which each keyword vector corresponds to a keyword of the plurality of keywords, and in which a dot product between two keyword vectors of the plurality of keyword vector indicates a level of similarity between respective keywords of the two keyword vectors. For example, the media guidance application may apply latent semantic analysis to generate a series of keyword vectors, in which the vector indicates a meaning of the keyword based on the words surrounding the keyword. For example, by applying latent semantic analysis, the media guidance application may identify media assets based not only on whether or not a word is present, but also on the particular meaning of that word. For example, instead of basing a determination on whether or not a media asset is of the "romance" genre based on the presence of the word "love," the media guidance application may base the determination on the presence of the word "love," synonyms thereof, or other words, the surrounding context of which correspond to "love." By using latent semantic analysis, the media guidance application may provide more accurate results on the presence and meaning of keywords in a media asset.

The media guidance application may compare each keyword vector of the plurality of keyword vectors to the remaining keyword vectors of the plurality of keyword vectors to determine which keyword vectors of the plurality of keyword vectors correspond. For example, the media guidance application may determine a dot product between each of the plurality of keyword vectors and the remaining keywords vectors to determine how similar each keyword vector is to the remaining vectors (e.g., if the dot product of the compared vectors exceeds a threshold value). For example, by comparing the entire keyword vector to other vectors, the media guidance application may determine whether or not keywords are associated with a similar subject matter. For example, if a first keyword (e.g., "love") was often used near (e.g., within a predetermined number of words between the keyword and another word) the same words (e.g., the names of three characters in the media asset) as a second keyword (e.g., "like"), the media guidance application may determine that the two keywords relate to similar subject matter (e.g., an emotional connection between the three characters).

In response to determining which keyword vectors of the plurality of keyword vectors correspond, the media guidance application may determines a subject matter vector based on the corresponding keyword vectors. For example, the media guidance application may determine that several keywords relate to an emotional connection between the three characters. Accordingly, the media guidance application may double the weight of a single keyword vector associated with a single keyword to reflect that two keywords vectors actually relate to the same subject matter.

The media guidance application may compare the subject matter vector to an attribute vector to determine whether the subject matter vector and the attribute vector correspond, in which the attribute vector represents a plurality of vectors associated with a selected attribute. For example, upon determining a subject matter vector that represents all the corresponding keywords in the media asset (or in response to determining that a subject matter vector has a threshold weight), the media guidance application may compare (e.g., determine a dot product) the subject matter vector to a vector that indicates the various attributes of a media asset associated with a known tag. For example, the media guidance application may compare the subject matter vector to a vector associated with a "love-triangle" sub-genre.

The media guidance application may tag the selected media asset record with the selected attribute in the first database in response to determining that the subject matter vector and the attribute vector correspond (e.g., if the dot product of the compared vectors exceeds a threshold value). For example, in response to determining that the subject matter vector associated with the emotional connection between three characters is similar to the attribute vector of the media asset associated with a "love-triangle" sub-genre, the media guidance application may tag the media asset as belonging to the "love-triangle" sub-genre.

In some embodiments, the media guidance application may further associate a keyword weight for each keyword in the media asset in which the weight denotes an estimate of the strength of the keyword in the context of the media asset. The media guidance application may also determine a subject matter vector based on the keyword vector weight associated with each of keyword. For example, keywords in the first line of description for the media asset may have a higher weight than keywords in other parts of the description. The media asset application may optionally scale the keyword vector with the weight so that the length of the keyword vector may then represent the weight of the keyword in the media asset.

In some embodiments, the weight associated with each of the plurality of vectors associated with the selected attribute is used to determine whether or not the subject matter vector and the attribute vector correspond. For example, the media guidance application may weigh different vectors associated with the attribute vector according to the importance of the vector in the attribute vector.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
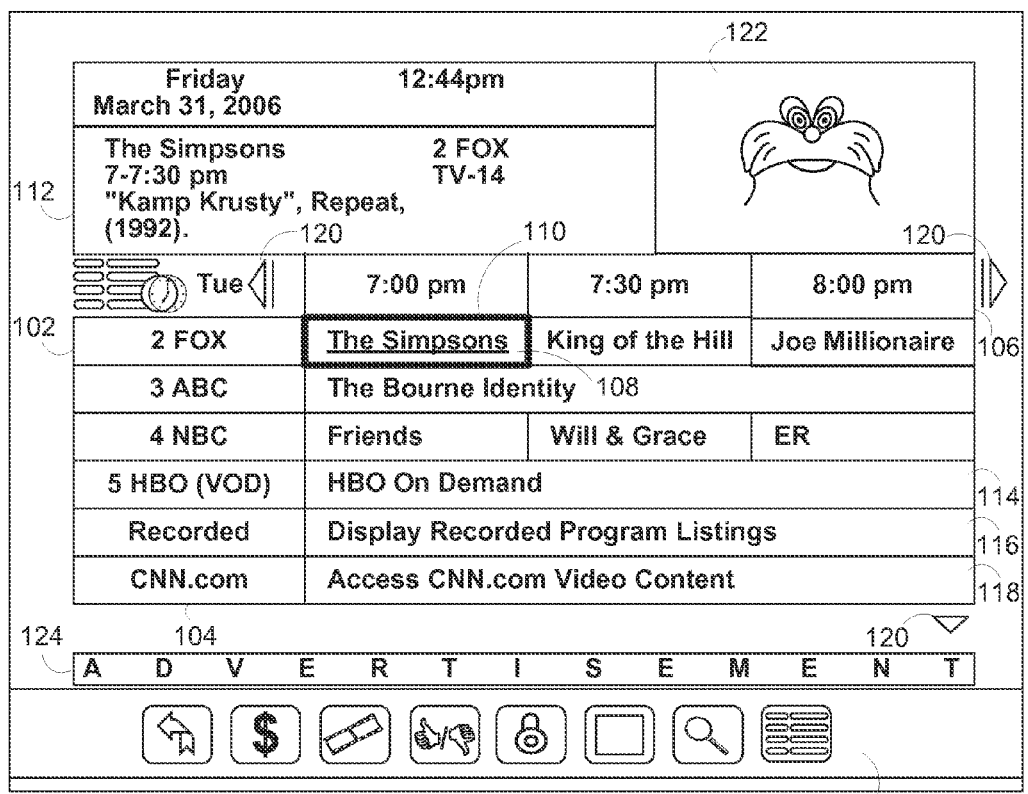
FIG. 1 shows and illustrative example of a display screen generated by a media guidance application in accordance with some embodiments of the disclosure.

Methods and systems are described herein for a media guidance application that can automatically, or with little human interaction, identify characteristics of media content (e.g., sub-genres, minor actors, etc.) and generate appropriate tags for that media content. The media guidance application can thus facilitate user searches based on specific and narrowly tailored search terms (e.g., sub-genres, minor actors, etc.).

As referred to herein, "a media guidance application" or "guidance application" is an application that facilitates the tagging of media content and/or allows a user to access media content through an interface. media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the media guidance application may be implemented on a user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below. Additionally or alternatively, the media guidance application may be implemented on any other computer hardware.

The media guidance application may facilitate the tagging of media content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

To identify various characteristics of media content, the media guidance application may mine the media asset (e.g., metadata, subtitles, closed captioning information, etc.) and/or media guidance data corresponding to the media asset. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

The media asset and/or the media guidance application may be stored in a local or remote database. For example, the database may be a lookup table in which the media guidance application may access the records associated with a media asset by inputting an identification of the media asset. For example, the media guidance application may select a media asset record from a first database, in which the first database lists a plurality of available media asset records. For example, the media guidance application may store a database that lists each available media asset, as well as the various characteristics and/or tags associated with a particular media asset.

The media guidance application may perform various analyses on the media asset, media guidance data, and/or any other information associated with the media asset to identify characteristics about the media asset. These characteristics may then be compared to known characteristics of media assets associated with a selected tag. Based on the comparison, the media guidance application may determine whether or not to tag the media asset with the selected tag. For example, the media guidance application may process the selected media asset record to determine a plurality of keywords corresponding to the selected media asset record.

For example, the media guidance application may analyze the subtitles or textual descriptions associated with a given media asset to determine keywords associated with the media asset.

As referred to herein, a "word" may include any data associated with a media asset. For example, a word may include a textual word composed of alphanumeric characters and/or symbols, computer readable code, or other mediums through which data may be communicated. Thus, a word may include a character string extracted from metadata associated with a media asset as well as a textual word displayed on-screen as part of a subtitle or textual description of a media asset. As referred to herein, "a keyword" includes any data that may be used to generate a keyword vector. For example, keyword may constitute a textual word appearing in a subtitle, closed caption, or textual summary of a media asset. In another example, the keyword may include a string of data pulled from metadata associated with a media asset.

To detect words or other data that may constitute keywords, the media guidance application may employ a plethora of content recognition techniques. For example, the media guidance application may analyze captured audio or video data to determine words. For example, the media guidance application may access a content recognition module or algorithm to determine the objects (e.g., words) in received data (e.g., a captured video). The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects and/or relationship between the objects in received data in order to identify individual words and the relationship of the individual words to other words.

For example, the media guidance application may receive data in the form of a video (e.g., captured via a content capture device at a location of the user). The video may include a series of frames. For each frame of the video, the media guidance application may use a content recognition module or an algorithm to determine the objects in each of the frames or series of frames. The media guidance application may then determine a relationship between words by determining that the number of words, length of time (e.g., in seconds), or the number of frames between two words. The media guidance application may record this information for use in generating a keyword vector as discussed below.

In some embodiments, the content recognition module or algorithm may also include speech recognition techniques, including, but not limited, to Hidden Markov Models, dynamic time warping, and/or neural networks (as described above) to translate spoken words into text and/or processing audio data. For example, in order to detect a keyword, the media guidance application may identify a word that was spoken by a character in a media asset. The media guidance application may process the audio data to identify a word that corresponds to the audio data. The content recognition module may also combine multiple techniques to determine the objects and/or the relationships between objects in received data.

In addition, the media application may use multiple types of optical character recognition and/or fuzzy logic. For example, when processing keyword(s) retrieved from data (e.g., textual data, translated audio data, user inputs, etc.). For example, using fuzzy logic, the media application (e.g., via a content recognition module or algorithm incorporated into, or accessible by, the media application) may determine two vectors, fields and/or values to be identical, even though the substance of the data or value is not identical.

In some embodiments, the media guidance application may use algorithms and techniques to compare vectors as well as determine components, angles, and magnitudes of a vector. For example, the media guidance application may determine a magnitude of a vector using algorithms based on the Pythagorean theorem. Likewise, the media guidance application may find an angle of a vector using an inverse tangent function. In another example, the media guidance application may determine that scalar product (or dot product) of two vectors in order to determine an angle between two vectors (or to determine an amount at which two vectors correspond). Finally, the media guidance application may perform weighted vector addition. In such cases, the media guidance application may multiple each vector by an assigned weight before adding the vectors together.

In some embodiments, the vectors may be two dimensional, three dimensional, etc. In each case, the media guidance application may determine the angle between these vectors. For example, the media guidance application may first identify the vectors to be compared. The media guidance application may then find the dot product by identifying the components of the vectors in each direction. The media guidance application may then multiply the respective components of both vectors along each axis with each other. The media guidance application may then add the multiplication products together to determine the dot product of the two vectors. The media guidance application may then calculate the magnitude of the two vectors using the Pythagorean theorem, and derive the inverse cosine to determine the angle between to vectors (e.g., a quantification of an amount at which to vectors correspond).

To determine individual keywords from detected words, the media guidance application may apply a set of rules. For example, the rules may indicate the words that may (or may not) constitute keywords and/or the types of words that may (or may not) constitute keywords. For example, if the rules indicate a list of words that may constitute keywords, the media guidance application may compare detected words to the list. In response to determining that a detected word corresponds to a word on a list, the media guidance application may designate the detected word as a keyword. In another example, the rules may determine whether or not a word is a type of word that may constitute a keyword. For example, the rules may indicate that only proper nouns, verbs, words beginning in a capitalized letter may constitute a keyword. In such cases, the media guidance application may cross-reference a detected word with a database listing a type associated with available words. After inputting the detected word, the database may output a type of that word. The media guidance application may then determine whether or not the type indicating the detected word may constitute a keyword.

The media guidance application may also generate vectors associated with each keyword. The media guidance application may store the keyword vectors in a database. The components in a respective keyword vector may indicate a relationship between a respective keyword (i.e., the keyword of the keyword vector) and other words (which may themselves constitute keywords associated with other keyword vectors) associated with a media asset. For example, the media guidance application may apply latent semantic analysis to generate a series of keyword vectors, in which the vector indicates a meaning of the keyword based on the words surrounding the keyword. For example, by applying latent semantic analysis, the media guidance application may identify media assets not only based on whether or not a word is present, but the particular meaning of that word.

For example, instead of basing a determination on whether or not a media asset includes the actor, "Tom Cruise," based on the presence of the word "Tom Cruise," the media guidance application may base the determination on the presence of the word "Tom," "Cruise," or other words, the surrounding context of which correspond, to "Tom Cruise" (e.g., "Mr. Cruise").

Using latent semantic analysis, the media guidance application may mathematically express each of the words associated with a media asset. The media guidance application may then generate vectors that represent the expression. The media guidance application may then compare the vectors to other vectors (representing expressions of other keywords associated with the media asset) to determine whether or not the keywords correspond.

For example, a single keyword vector may indicate the words surrounding a particular keyword. Likewise, the keyword vector may indicate the number of words between the given keyword and other words (or other keywords) associated with a media asset. The media guidance application then expresses these relationships in the form a vector. For example, each component of the vector may be based on a quantification of the number of words between a keyword and another word (or if the other word even surrounds the keyword).

The media guidance application may compare each keyword vector of the plurality of keyword vectors to the remaining keyword vectors of the plurality of keyword vectors to determine which keyword vectors of the plurality of keyword vectors correspond. For example, the media guidance application may determine a dot product of two keyword vectors. The dot product indicates the level of similarity between two vectors. For example, the angle between two keyword vectors denotes a relationship between a respective keyword and one other word corresponding to the selected media asset. The media guidance application may then compare this value (i.e., the dot product) to a threshold value or range. As referred to herein, the "threshold value" or "threshold range" is a value or range that indicates a minimum amount of similarity between two vectors. The media guidance application may base the threshold value or range on a user input, industry standard, or other measurements. In some embodiments, the threshold value or range may be dynamically adjusted based on the media asset or the amount of data associated with a media asset.

If the dot product exceeds the threshold value, is within the threshold range of values, or otherwise corresponds to the threshold value, the media guidance application may determine that the two keyword vectors used to generate the dot product correspond. For example, the media guidance application may determine a dot product between each of the plurality of keyword vectors and the remaining keywords vectors to determine how similar each keyword vector is to the remaining vectors. For example, by comparing the entire keyword vector to other vectors, the media guidance application may determine whether or not keywords are associated with a similar subject matter, as well as which keyword vectors among the plurality of keyword vectors are similar.

For example, if a first keyword (e.g., "Robert") was often used near (e.g., within a predetermined number of words between the keyword and another word) the same words (e.g., the name of a character) as a second keyword (e.g., "Bob"), the media guidance application may determine that the two keywords relate to similar subject matter (e.g., the identity of a character). In another example, the media guidance application may group several keywords that are related to an emotional connection between the three characters into a single subject matter. For example, if a first keyword (e.g., "love") was often used in context of an emotional connection, and another related keyword (e.g., "like"), the media guidance application may group the two into the same subject matter vector to denote that the two keywords relate to similar subject matter.

In response to determining which keyword vectors of the plurality of keyword vectors correspond, the media guidance application may determine a subject matter vector based on the corresponding keyword vectors. For example, the media guidance application may determine that several keywords relate (e.g., "Robert" and "Bob") relate to the same subject matter (e.g., a character in the media asset) despite the different spellings of the keywords. Accordingly, the media guidance application may combine the keyword vectors when determining a subject matter vector for the media asset.

In some embodiments, in response to determining which keyword vectors of the plurality of keyword vectors correspond, the media guidance application may also determine a vector to represent the subject matter. Additionally, the media guidance application may associate a weight with the subject matter that can be formed from the individual keyword weights to reflect that several keywords vectors actually relate to the same subject matter within that media asset.

The media guidance application may also be able to generate a vector for a specific attribute (such as "love-triangle"). The media guidance application may make this determination by considering the various media assets corresponding to the attribute and analyzing the subject matters corresponding to the individual media assets and grouping the subject matter vectors corresponding the media assets having the attribute. The media guidance application may then associate a weight to each group based on the weights of the individual subject matters in the group. The media guidance application may choose only those groups of subject matters that have weight greater than some threshold. The media application then makes a vector for the attribute using the vectors and weights associated with the chosen groups.

As referred to herein, "a subject matter vector" is a vector that describes a particular subject matter of a media asset. It should be noted that a given media asset may have a plurality of subject matters, each associated with different subject matter. For example, a given subject matter vector may correspond to a genre or sub-genre of a media asset. In such a case, the subject matter vector may be based on keyword vectors that describe keywords associated with a genre or sub-genre.

In addition to a plurality of subject matter vectors being associated with a single media asset, the media guidance application may associate each subject matter vector with a particular weight. For example, the weight of a particular subject matter vector may indicate the number of keyword vectors used to create the subject matter vector. Thus, the weight may also include the importance of the subject matter vector when determining a particular tag to assign to the media asset.

Additionally, it should be noted that the size of the keyword vector upon which a subject matter vector is based may affect the weight of the subject matter vector. For example, a large keyword vector (e.g., indicating that a particular keyword often occurred in a media asset) may cause the media guidance application to weigh a subject matter vector based on that keyword vector more heavily than a small keyword vector (e.g., indicating that a particular keyword did not appear often in a media asset).

For example, the media guidance application may weigh a first subject matter vector, which is based on three keyword vectors, three times the amount that a second subject matter vector, which is based on a single keyword vector, is weighed. Furthermore, in some embodiments, the media guidance application may compare the weight to a threshold weight in order to determine whether or not the subject matter vector should be used to determine a tag for the media asset. For example, a threshold weight may indicate the minimum amount of weight that a given subject matter vector must have to be compared to an attribute vector.

The media guidance application may compare the subject matter vector to an attribute vector to determine whether the subject matter vector and the attribute vector correspond. As referred to herein, an "attribute vector" is a vector that includes a plurality of vectors associated with a selected attribute. As referred to herein, an "attribute" is any characteristics used to distinguish one media asset (or group of media assets) from another media asset (or another group of media assets. For example, an attribute may include one or more media assets categorized based on whether or not the media asset includes or is associated with one or more characteristics (e.g., genres of the media asset, concepts of the media asset, cliché s in the media asset, stereotypical characters in the media asset, personalities in the media asset roles played by an actor in the media asset, themes of the media asset, tones of the media asset, objects appearing in the media asset, color palettes used by the media assets, moods of the media asset, time-periods discussed in the media asset, numbers of actors in the media asset, ratings of the media asset, languages associated with the media asset, and/or any other media guidance data associated with the media asset). For example, an attribute vector may correspond to a subject matter vector (or a plurality of subject matter vectors) of a media asset that is known to have a certain attribute (e.g., a genre). Thus, the media guidance application may compare a subject matter vector (e.g., associated with a genre of a selected media asset) to the attribute vector to determine whether or not the selected media asset is a particular genre. For example, upon determining a subject matter vector that represents all the corresponding keywords in the media asset (or in response to determining that a subject matter vector has a threshold weight), the media guidance application may compare the subject matter vector to the attribute vector by determining a dot product of the vectors. The dot product may then be compared to a threshold value to determine whether or not the media asset associated with the subject matter vector corresponds to the attribute associated with the attribute vector. If so, the media guidance application may tag the media asset (or a record associated with the media asset in a database) with the attribute.

In some embodiments, the media guidance application may select particular attribute to search for based on the reliability of the subject matters in determining an attribute. For example, if subject matter is a good indicator of an attribute, then that attribute may be searched for. Alternatively or additionally, the media guidance application may search for particular attributes based on industry standards or user selections.

In some embodiments, the attribute vector may include a plurality of vectors each associated with a subject matter related to the attribute. Furthermore, each vector may be weighed according to the importance of the vector in determining whether or not a media asset corresponds to the attribute. For example, the weight associated with each of the plurality of vectors associated with the selected attribute is used to determine whether or not the subject matter vector and the attribute vector correspond. For example, the media guidance application may weigh different vectors associated with the attribute vector according to the importance of the vector in the attribute vector.

In some embodiments, the media guidance application may determine an attribute vector by grouping subject matter vectors that correspond to media assets known to correspond to the attribute. For example, the media guidance application may group subject matter vectors corresponding to media assets having the attribute and associate a weight to each group based on the weights of the individual subject matters in the group. The media guidance application may then select the groups of subject matters that have weight greater than a threshold weight. Based on the selections, the media guidance application may generate a vector for the attribute from the vectors and weights associated with each group.

In some embodiments, The media guidance application may determine multiple subject matters of a media asset that correspond to a particular attribute vector and may use the closeness of each subject matter along with the corresponding weight of the subject matter to determine a final weight of the attribute for the media asset. The media guidance application may then compare the final weight of the attribute to a threshold value to determine whether or not a media asset should be tagged as corresponding to the attribute.

As referred to herein, a "tag" is any computer-readable data that indicates an attribute about a media asset. For example, a tag may include a field in a database that is associated with a particular genre, indicates the presence of a particular actor, etc. In some embodiments, the tags may allow a database featuring a plurality of tags to be searched based on one or more search terms. For example, a search request for a particular genre may return media listings for all available media assets that are tagged as constituting the particular genre.

The tags may indicate any attribute of the media asset. For example, the tag may indicate the presence (or lack thereof) of any media guidance data. In another example, the tag may indicate a category, no matter how generic or unique. Furthermore, in some embodiments, the tags may involve manual or semi-automatic verification from one or more users. For example, an operator may manually review all tags for quality control. In another example, the tags may be verified by crowd sourcing the task to a plurality of users (e.g., via a social network). In such cases, the media guidance application may ask users to verify whether or not a particular media asset corresponds to a particular tagged attribute. If so (e.g., a quota of users verifies or fails to oppose a tagging), the media guidance application updates a database listing media asset tag with the verified tag.

The media guidance application may continuously or periodically retrieve and/or update tags associated with media assets. In some embodiments, the media guidance application may retrieve and/or update tags based on one or more triggers. For example, in response to detecting that one or more media listings are displayed to a user and/or the user has requested access to an electronic program guide (e.g., as discussed below in relation to FIGS. 1-2). The media guidance application may retrieve and/or update tags associated with one or more media assets.

Figure 2:
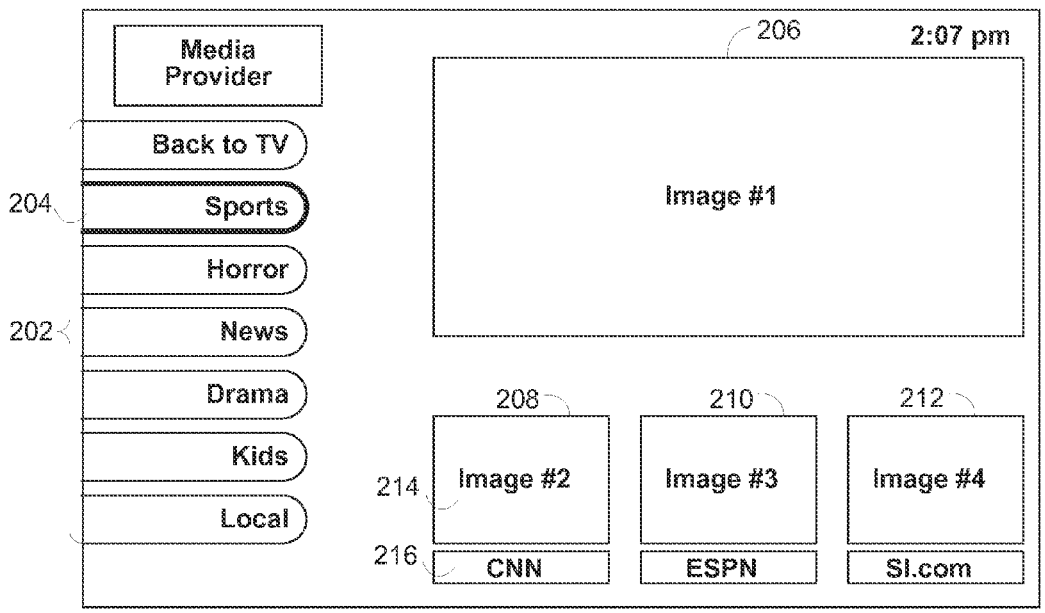
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
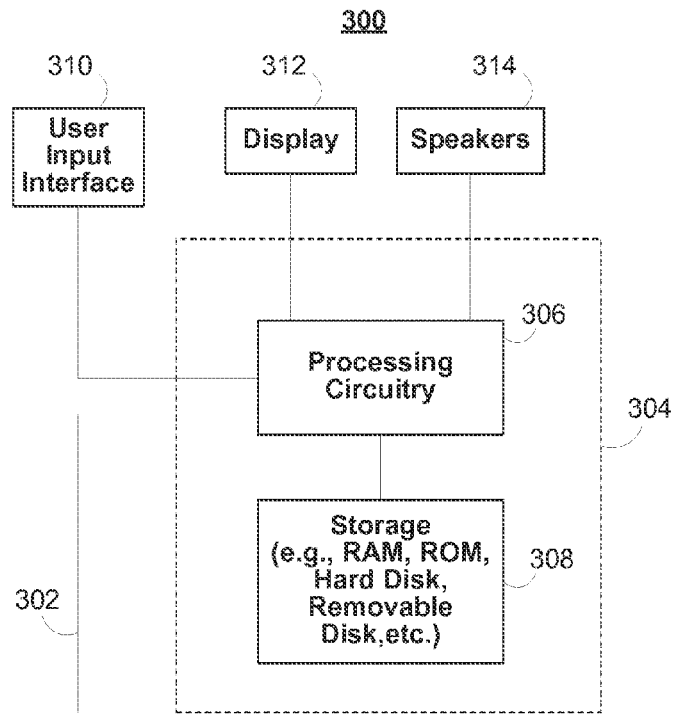
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
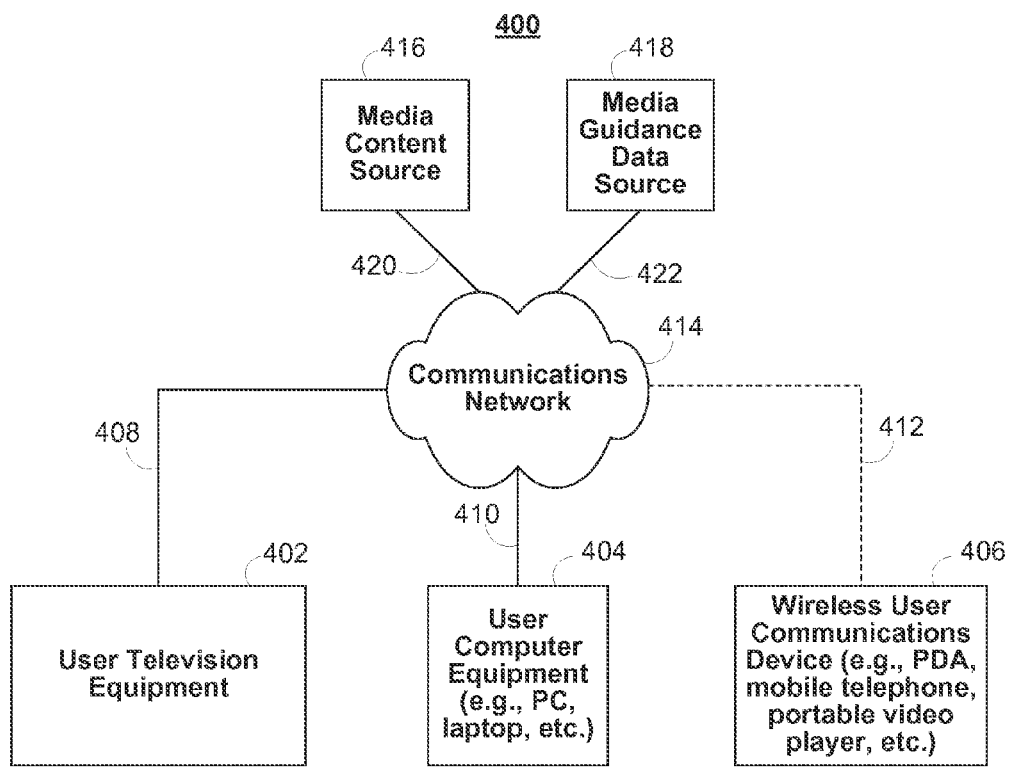
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
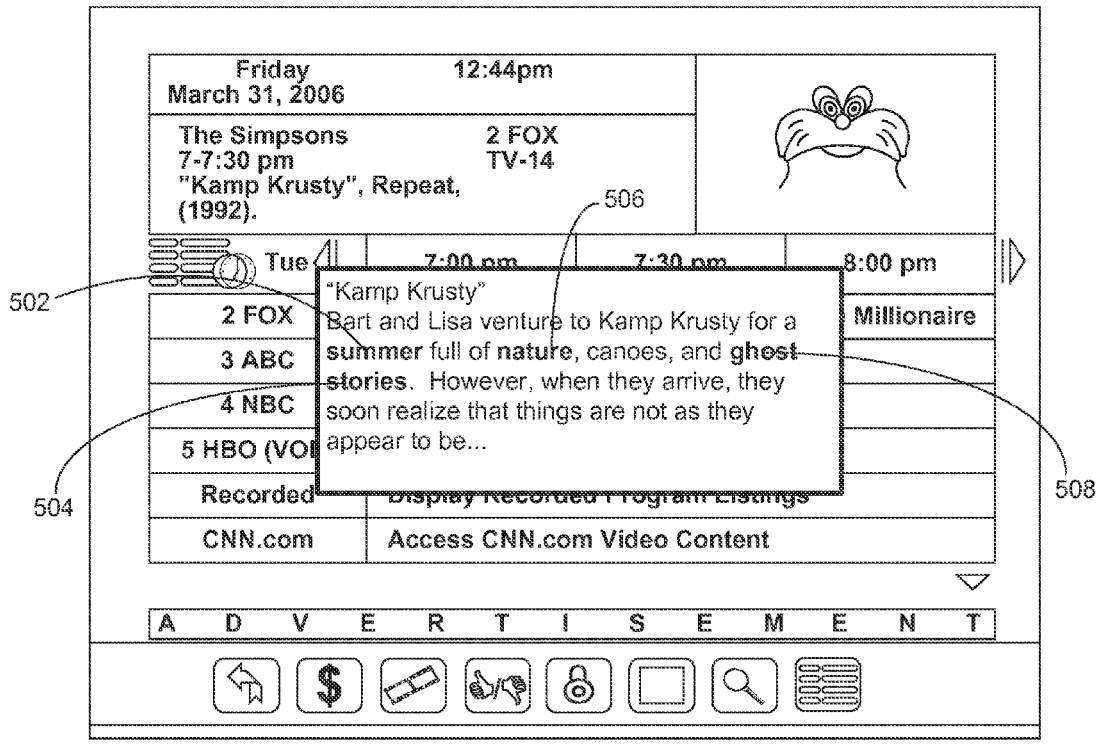
FIG. 5 shows illustrative examples of keywords being detected in media assets in accordance with some embodiments of the disclosure.
Figure 5:
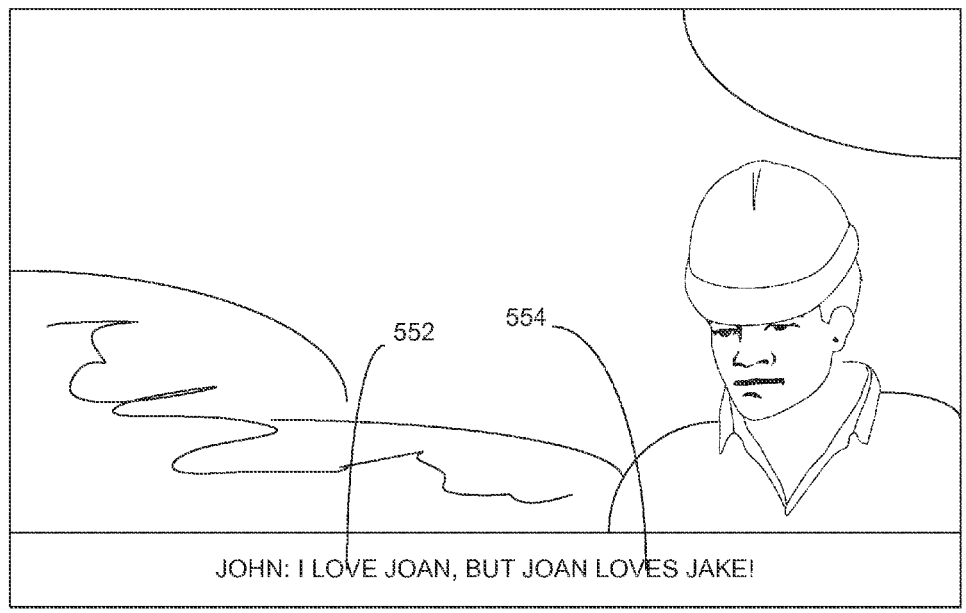

FIG. 5 shows illustrative examples of a keywords being detected in media assets. For example, as discussed above, the media guidance application may use numerous techniques to identify words associated with a media asset, identify keywords within those words, and to identify relationships between the keywords and other words for use in generating keyword vectors. It should be noted that FIG. 5 shows two examples in which words associated with a media asset appear on-screen. However, the media guidance application may also detect words associated with a media asset even if the words are not presented on-screen.

FIG. 5 shows two examples of display screens that may be generated for display by a media guidance application. For example, display 500 may represent display 100 (FIG.

1) after a user has requested additional information about program listing 108 (FIG. 1). For example, in response to a user input (e.g., via user input interface 310 (FIG. 3)), the media guidance application may present display 500, which features a textual description of the media asset associated with program listing 108 (FIG. 1).

In display 500, a textual summary is displayed that features numerous words. Furthermore, display 500 includes several words (e.g., keywords 502, 504, 506, and 508) that the media guidance application has determined constitute keywords. In display 500, keywords 502, 504, 506, and 508 are bolded to indicate their selection as keywords. In response to the selection of keywords 502, 504, 506, and 508 as keywords, the media guidance application may express each of keywords 502, 504, 506, and 508 as a keyword vector.

For example, values associated with akeyword vector may corresponds to the words around a respective keyword as well as the number of words between the word and the keyword. For example, the media guidance application may apply latent semantic indexing to each keyword (e.g., using singular value decomposition) to identify patterns in the relationships between the terms and concepts contained in an unstructured collection of words associated with the media asset. For example, using latent semantic indexing, the media guidance application may determine keywords that have the same meaning (even though the keywords are different) based on the context (e.g., the words surrounding the keyword) in which those keywords are used.

For example, the media guidance application may determine that, because keyword 506 is near 502, a particular definition may be implied (e.g., the phenomena of the physical world) as opposed to a different meaning (e.g., the basic or inherent features of something). In another example, a characteristic indicated by a keyword may change based on the context of the keywords. For example, in some circumstances keyword 508 (e.g., "ghost") may be associated with a horror genre, as "ghosts" are normally associated with horror movies. However, the words surrounding keyword 508 may indicate that this particular instance of keyword 508 is not a good indicator of genre. For example, while keyword 508 may typically be associated with the horror genre, the words around keyword 508 (including keywords 502, 504, and 506) are not associated with the horror genre.

In display 550, subtitle data is displayed that features numerous words. Furthermore, display 550 includes a word (e.g., keyword 552) that the media guidance application has determined constitutes a keyword. As keyword 552 and keyword 554 constitute an identical word (e.g., "love"), the media guidance application may generate a single keyword vector for both keywords 552 and 554. For example, the keyword vector for both keywords 552 and 554 may have twice the magnitude of a similar keyword vector that is based on only a single instance of its respective keyword. Alternatively or additionally, the media guidance application may generate two keyword vectors, one for keyword 552 and one for keyword 554. For example, while the spelling and/or meaning of keywords 552 and 554 is the same, the media guidance application may determine that the words around the respective keywords differ.

For example, both keywords 552 and 554 are verbs that indicate an emotional connection between two objects (e.g., two people). However, keyword 552 indicates an emotional connection between two different objects (e.g., John and Joan) than keyword 554 indicates (e.g., Joan and Jake). The differences in objects surrounding each keyword may be recorded in a keyword vector associated with each keyword and used by the media guidance application to determine that the media asset associated with keywords 552 and 554 features multiple objects with different emotional connections. Accordingly, a subject matter vector generated based on the keywords vector may also indicate such information, and when compared to an attribute vector (e.g., as discussed below in relation to FIG. 6) and associated with a "love triangle" sub-genre may indicate to the media guidance application that the media asset should be tagged as a "love triangle" sub-genre.

Figure 6:
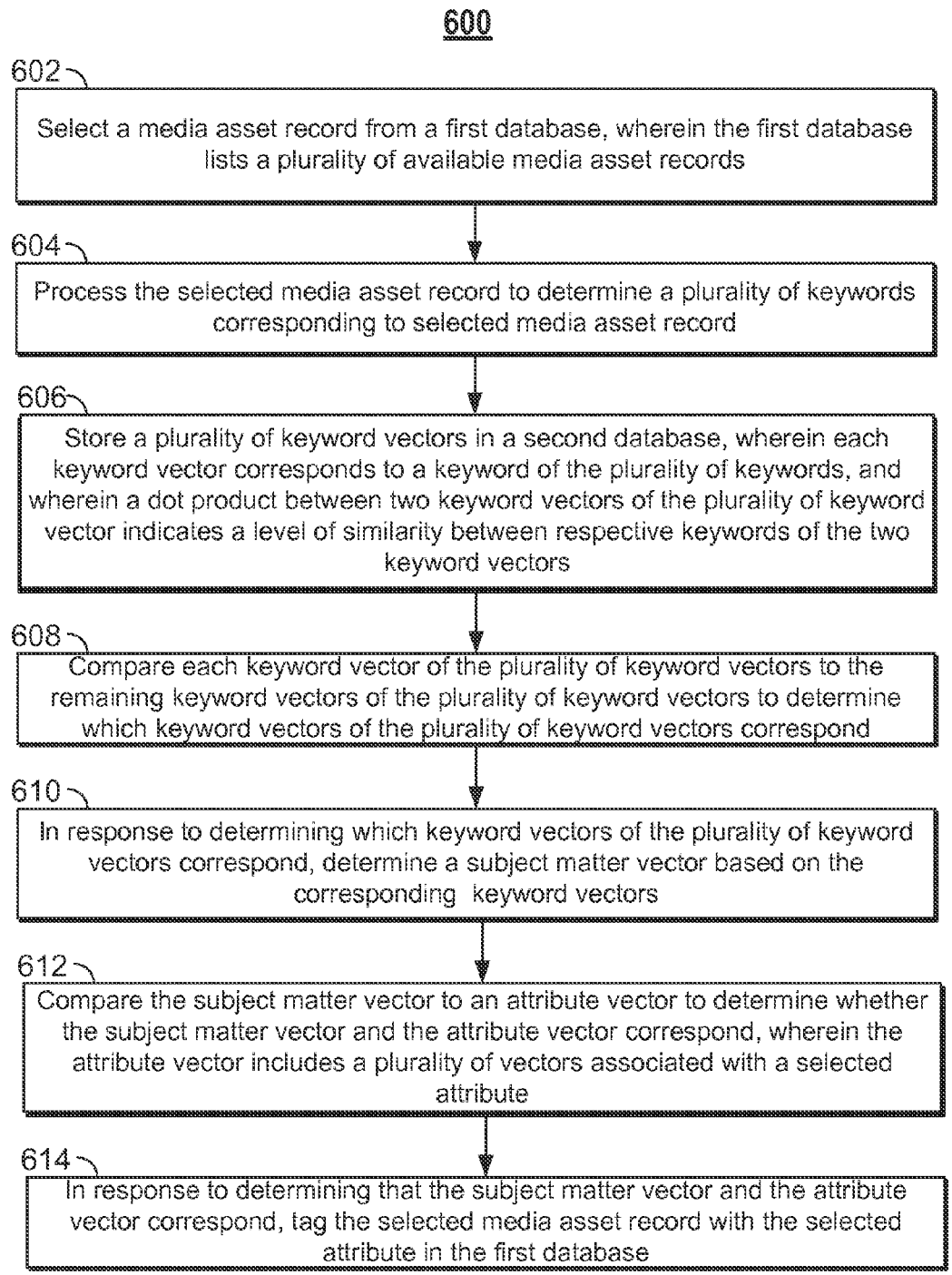
FIG. 6 is a flowchart of illustrative steps for tagging media assets in accordance with some embodiments of the disclosure.

FIG. 6 is a flowchart of illustrative steps for tagging media assets. It should be noted that process 600, or any step thereof, could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to tag a media asset. In addition, one or more steps of process 600 may be incorporated into or combined with one or more steps of any other process or embodiment (e.g., process 700 (FIG. 7)).

At step 602, the media guidance application selects (e.g., via control circuitry 304 (FIG. 3)) a media asset record from a first database (e.g., located at storage 308, media content source 416 (FIG. 4), media guidance data source 418 (FIG. 4), and/or any other location accessible via communications network 414 (FIG. 4)), in which the first database lists a plurality of available media asset records. For example, the media guidance application may store (e.g., at storage 308, media content source 416 (FIG. 4), media guidance data source 418 (FIG. 4), and/or any other location accessible via communications network 414 (FIG. 4)) a database that lists each available media asset as well as the various characteristics and/or tags associated with a particular media asset.

At step 604, the media guidance application processes (e.g., via control circuitry 304 (FIG. 3)) the selected media asset record to determine a plurality of keywords corresponding to a selected media asset record. For example, the media guidance application may analyze (e.g., via control circuitry 304 (FIG. 3)) the subtitles or textual descriptions associated with a given media asset (e.g., as discussed in relation to FIG. 5)) to determine keywords associated with the media asset.

At step 606, the media guidance application stores (e.g., at storage 308, media content source 416 (FIG. 4), media guidance data source 418 (FIG. 4), and/or any other location accessible via communications network 414 (FIG. 4)) a plurality of keyword vectors in a second database, in which each keyword vector corresponds to a keyword of the plurality of keywords, and in which a dot product between two keyword vectors of the plurality of keyword vector indicates a level of similarity between respective keywords of the two keyword vectors. For example, the media guidance application may apply (e.g., via control circuitry 304 (FIG. 3)) latent semantic analysis to determine a series of keyword vectors, in which the vector indicates a meaning of the keyword based on the words surrounding the keyword. For example, by applying latent semantic analysis, the media guidance application may identify media assets not only based on whether or not a word is present, but the particular meaning of that word. For example, instead of basing a determination on whether or not a media asset features an actor "Tom Cruise" based on the presence of the word "cruise" in the description of the media asset, the media guidance application may base the determination on the context of word "cruise" (e.g., whether or not the context of the word indicate that the word is associated with the actor, "Tom Cruise"). By using latent semantic analysis, the media guidance application may provide more accurate results on the presence and meaning of keywords in a media asset.

At step 608, the media guidance application compares (e.g., via control circuitry 304 (FIG. 3)) each keyword vector of the plurality of keyword vectors to the remaining keyword vectors of the plurality of keyword vectors to determine which keyword vectors of the plurality of keyword vectors correspond. For example, the media guidance application may determine (e.g., via control circuitry 304 (FIG. 3)) a dot product between each of the plurality of keyword vectors and the remaining keywords vectors to determine how similar each keyword vector is to the remaining vectors (e.g., if the dot product of the compared vectors exceeds a threshold value). For example, by comparing (e.g., via control circuitry 304 (FIG. 3)) the entire keyword vector to other vectors, the media guidance application may determine (e.g., via control circuitry 304 (FIG. 3)) whether or not keywords are associated with a similar subject matter. For example, if a keyword (e.g., "basketball") was often used near (e.g., within a predetermined number of words between the keyword and another word) words that indicate a genre of the media asset, the media guidance application may determine that the word "basketball" indicates a genre of the media asset (e.g., a sports genre).

At step 610, in response to determining (e.g., via control circuitry 304 (FIG. 3)) which keyword vectors of the plurality of keyword vectors correspond, the media guidance application determines (e.g., via control circuitry 304 (FIG. 3)) a subject matter vector based on the corresponding keyword vectors. For example, the media guidance application may determine (e.g., via control circuitry 304 (FIG. 3)) that several keywords relate to an emotional connection between the three characters. Accordingly, the media guidance application may double the weight of a single keyword vector associated with a single keyword to reflect that two keywords vectors actually relate to the same subject matter.

At step 612, the media guidance application compares (e.g., via control circuitry 304 (FIG. 3)) the subject matter vector to an attribute vector (e.g., retrieved from storage 308, media content source 416 (FIG. 4), media guidance data source 418 (FIG. 4), and/or any other location accessible via communications network 414 (FIG. 4)) to determine whether the subject matter vector and the attribute vector correspond, in which the attribute vector includes a plurality of vectors associated with a selected attribute. For example, upon determining (e.g., via control circuitry 304 (FIG. 3)) a subject matter vector that represents all the corresponding keywords in the media asset (or in response to determining that a subject matter vector has a threshold weight), the media guidance application may compare (e.g., via control circuitry 304 (FIG. 3)) the subject matter vector to a vector that indicates the various attributes of a media asset associated with a known tag. For example, the media guidance application may compare the subject matter vector to a vector associated with a media asset that has a known attribute (e.g., the sub-genre is known).

At step 614, the media guidance application tags (e.g., via control circuitry 304 (FIG. 3)) the selected media asset record (e.g., located at storage 308, media content source 416 (FIG. 4), media guidance data source 418 (FIG. 4), and/or any other location accessible via communications network 414 (FIG. 4)) with the selected attribute in the first database in response to determining that the subject matter vector and the attribute vector correspond (e.g., if the dot product of the compared vectors exceeds a threshold value). For example, in response to determining (e.g., via control circuitry 304 (FIG. 3)) that the subject matter vector associated with the media asset corresponds to the attribute vector, the media guidance application may tag (e.g., via control circuitry 304 (FIG. 3)) the media asset as having the same attribute as the media asset associated with the attribute vector.

In some embodiments, the media guidance application may additionally associate a keyword vector weight with each of the two keyword vectors based on a keyword weight corresponding to the respective keywords. The media guidance application may then determine the subject matter vector based on the keyword vector weight associated with each of the two keyword vectors. For example, the location of the keywords among the keywords associated with a media asset may depend on the weight that the media guidance application gives the respective keyword. For example, keywords in the title of the media asset may have a higher weight than keywords in the description of the media asset. The media asset application may optionally scale the keyword vector with the weight so that the length of the keyword vector may then represent the weight of the keyword in the media asset.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
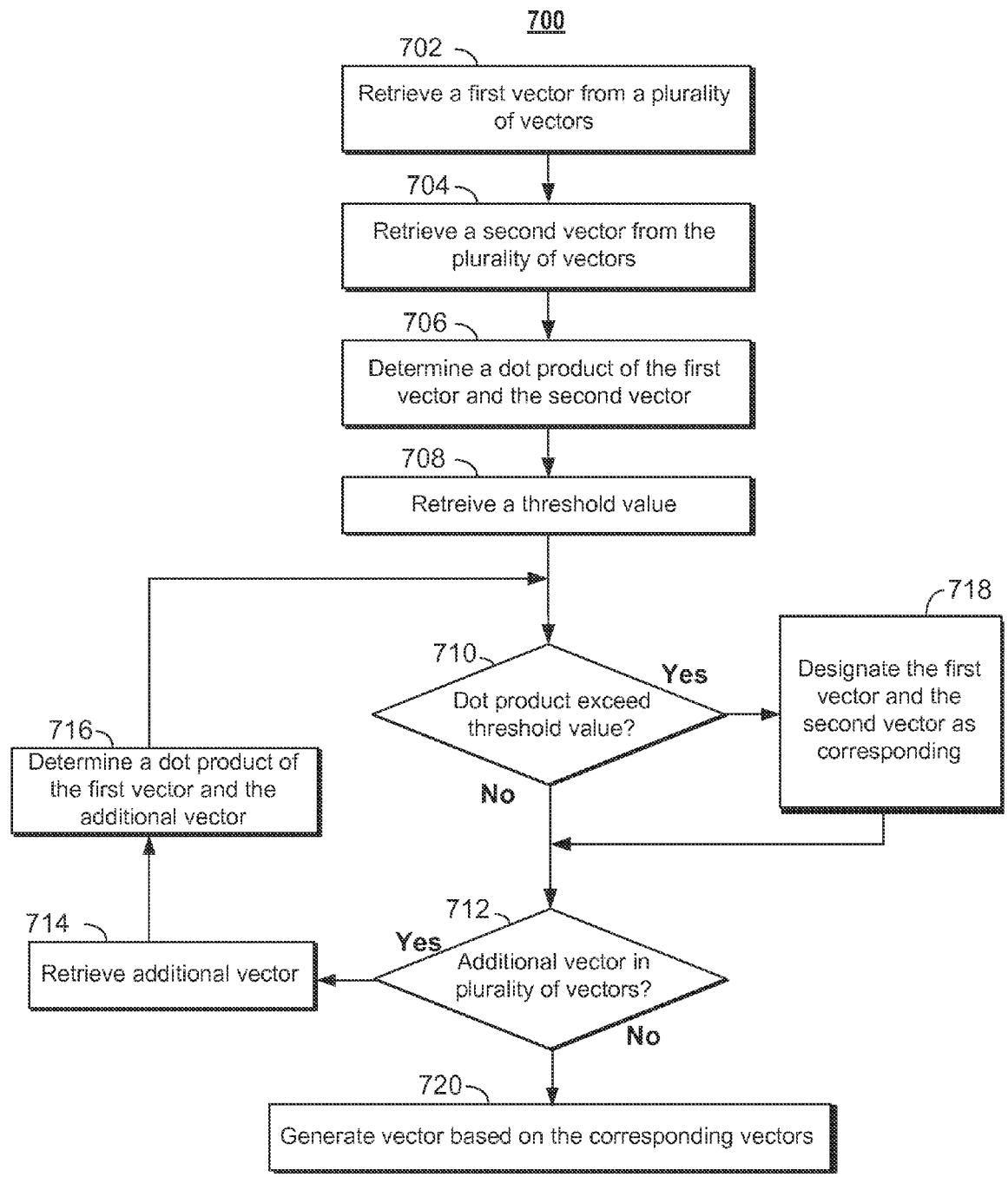
FIG. 7 is a flowchart of illustrative steps for generating a vector in accordance with some embodiments of the disclosure.

FIG. 7 is a flowchart of illustrative steps for generating a vector. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to generate a vector. In addition, one or more steps of process 700 may be incorporated into or combined with one or more steps of any other process or embodiment (e.g., process 600 (FIG. 6)).

At step 702, the media guidance application retrieves (e.g., via control circuitry 304 (FIG. 3)) a first vector from a plurality of vectors (e.g., located at storage 308, media content source 416 (FIG. 4), media guidance data source 418 (FIG. 4), and/or any other location accessible via communications network 414 (FIG. 4)). For example, the media guidance application may retrieve a keyword vector from a plurality of keyword vectors or may retrieve a subject matter vector from a plurality of subject matter vectors.

At step 704, the media guidance application retrieves (e.g., via control circuitry 304 (FIG. 3)) a second vector from a plurality of vectors (e.g., located at storage 308, media content source 416 (FIG. 4), media guidance data source 418 (FIG. 4), and/or any other location accessible via communications network 414 (FIG. 4)). For example, the media guidance application may retrieve a different keyword vector from a plurality of keyword vectors or may retrieve a different subject matter vector from a plurality of subject matter vectors.

At step 706, the media guidance application determines (e.g., via control circuitry 304 (FIG. 3)) a dot product of the first vector and the second vector. For example, by determining a dot product between the first vector and the second vector, the media guidance application may determine the level of similarity between the two vectors. For example, if the first vector and second vector are keyword vectors, determining the dot product of the two keyword vectors may indicate the level of similarity between the keywords associated with the two keyword vectors. In another example, if the first vector and the second vector are subject matter vectors, determining the dot product of the two keyword vectors may indicate the level of similarity between the subject matters associated with the two subject matter vectors.

At step 708, the media guidance application retrieves (e.g., from storage 308, media content source 416 (FIG. 4), media guidance data source 418 (FIG. 4), and/or any other location accessible via communications network 414 (FIG. 4)) a threshold value. The threshold value may indicate a required level of similarity. For example, if the two vectors are keyword vectors, the threshold value may indicate a level of similarity between the two vectors that is required to combine the two keyword vectors into a subject matter vector.

At step 710, the media guidance application determines (e.g., via control circuitry 304 (FIG. 3)) whether or not the dot product exceeds the threshold value. For example, if the two vectors are keyword vectors, the dot product exceeding the threshold value may indicate that the keyword vectors should be combined into a subject matter vector. If the dot product does exceed the threshold value, the media guidance application proceeds to step 718 and designates the first vector and the second vector as corresponding before proceeding to step 712. If the dot product does not exceed the threshold value, the media guidance application proceeds to step 712.

At step 712, the media guidance application determines (e.g., via control circuitry 304 (FIG. 3)) whether or not there are additional vectors in the plurality of vectors. For example, if the first vector and second vector are keyword vectors, the media guidance application determines (e.g., via control circuitry 304 (FIG. 3)) whether or not there are additional keyword vectors in the plurality of keyword vectors (e.g., at storage 308, media content source 416 (FIG. 4), media guidance data source 418 (FIG. 4), and/or any other location accessible via communications network 414 (FIG. 4)). In another example, if the first vector and second vector are subject matter vectors, the media guidance application determines (e.g., via control circuitry 304 (FIG. 3)) whether or not there are additional subject matter vectors in the plurality of subject matter vectors (e.g., at storage 308, media content source 416 (FIG. 4), media guidance data source 418 (FIG. 4), and/or any other location accessible via communications network 414 (FIG. 4)).

If the media guidance application determines that there are additional vectors in the plurality of vectors, the media guidance application proceeds to step 714. At step 714, the media guidance application retrieves (e.g., via control circuitry 304 (FIG. 3)) an additional vector before proceeding to step 716. For example, if the first vector and second vector are keyword vectors, the media guidance application retrieves (e.g., via control circuitry 304 (FIG. 3)) an additional keyword vector from the plurality of keyword vectors (e.g., at storage 308, media content source 416 (FIG. 4), media guidance data source 418 (FIG. 4), and/or any other location accessible via communications network 414 (FIG. 4)). In another example, if the first vector and second vector are subject matter vectors, the media guidance application retrieves (e.g., via control circuitry 304 (FIG. 3)) an additional subject matter vector from the plurality of subject matter vectors (e.g., at storage 308, media content source 416 (FIG. 4), media guidance data source 418 (FIG. 4), and/or any other location accessible via communications network 414 (FIG. 4)).

At step 716, the media guidance application determines a dot product of the first vector and the additional vector before proceeding to step 710. For example, the media guidance application may compare the first vector to each vector in the plurality of vectors to determine whether or not the vectors correspond. In some embodiments, the media guidance application may perform process 700 on each vector in the plurality of vectors. Accordingly, the media guidance application may determine which vectors of the plurality of vectors correspond to each other.

At step 720, the media guidance application generates (e.g., via control circuitry 304 (FIG. 3)) a vector based on the corresponding vectors. For example, if the vectors are keyword vectors, the vectors may be combined into a subject matter vector. In another example, if the vectors are subject matter vectors, the subject matter vectors may be combined into a subject matter vector that is weighted (e.g., when compared to an attribute vector) based on the number of subject matter vectors that are combined.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing detailed tagging for media content searches by updating database tags for media content based on a comparison of known characteristics of media assets corresponding to a selected tag to characteristics of media assets not currently corresponding to the selected tag, the method comprising:

selecting a media asset record from a first database, wherein the first database lists a plurality of available media asset records for a media asset, wherein each of the plurality of available media asset records is a descriptive metadata tag;

processing the selected media asset record to determine a plurality of keywords corresponding to the selected media asset record based on a respective descriptive metadata tag for the selected media asset record;

storing a plurality of keyword vectors in a second database, wherein each of the plurality of keyword vectors indicates a meaning of a respective keyword based on a frequency at which other words surround the respective keyword, and wherein a dot product between two keyword vectors of the plurality of keyword vectors indicates a level of similarity between respective keywords of the two keyword vectors;

determining a respective dot product for each keyword vector of the plurality of keyword vectors and each of the remaining keyword vectors of the plurality of keyword vectors;

comparing the respective dot product for each keyword vector of the plurality of keyword vectors to a threshold value;

in response to determining which of the respective dot products exceeds the threshold value, determining a subject matter vector based on the similar keyword vectors with the respective dot products that exceed the threshold value, wherein the subject matter vector indicates keywords corresponding to the subject matter;

comparing the subject matter vector to an attribute vector to determine whether the subject matter vector and the attribute vector correspond, wherein the attribute vector includes a plurality of vectors associated with a selected attribute, and wherein the selected attribute is a characteristic of the media asset used to distinguish the media asset from other media assets;

in response to determining that the subject matter vector and the attribute vector correspond, tagging the selected media asset record with the selected attribute in the first database;

receiving a user request for media assets corresponding to the selected attribute; and generating for display a listing for the selected media asset record based on the tagging.

2. The method of claim 1, wherein each of the keywords in the plurality of keywords is identified from subtitle data or descriptive textual data associated with the media asset.

3. The method of claim 1, further comprising:
associating a keyword vector weight with each of the two keyword vectors based on a keyword weight corresponding to the respective keywords; and
determining the subject matter vector based on the keyword vector weight associated with each of the two keyword vectors.

4. The method of claim 1, wherein a weight associated with each of the plurality of vectors associated with the selected attribute is used to determine whether the subject matter vector and the attribute vector correspond.

5. The method of claim 1, wherein comparing the respective dot product for each keyword vector of the plurality of keyword vectors to a threshold value comprises:
determining a first dot product of a first keyword vector of the plurality of keyword vectors and a second keyword vector of the plurality of keyword vectors;
retrieving a first threshold value from the second database; and
comparing the dot product to the first threshold value.

6. The method of claim 1, wherein the attribute vector includes a plurality of values associated with a selected attribute, and wherein comparing the subject matter vector to an attribute vector to determine whether the subject matter vector and the attribute vector correspond further comprises:
determining a second dot product of the subject matter vector and the attribute vector;
retrieving a second threshold value from the second database; and
comparing the second dot product to the second threshold value.

7. The method of claim 1, wherein the selected attribute is a genre.

8. The method of claim 1, further comprising weighting the subject matter vector based on a number of keyword vectors of the plurality of keyword vectors that correspond to the subject matter vector.

9. The method of claim 8, further comprising determining whether to compare the subject matter vector to the attribute vector based on a weight corresponding to the subject matter vector.

10. A system for providing detailed tagging for media content searches by updating database tags for media content based on a comparison of known characteristics of media assets corresponding to a selected tag to characteristics of media assets not currently corresponding to the selected tag, the system comprising:
storage circuitry configured to store a first database, wherein the first database lists a plurality of available media asset records for a media asset, wherein each of the plurality of available media asset records is a descriptive metadata tag; and
control circuitry configured to:
select a media asset record from the first database;
process the selected media asset record to determine a plurality of keywords corresponding to the selected media asset record based on a respective descriptive metadata tag for the selected media asset record;
store a plurality of keyword vectors in a second database, wherein each of the plurality of keyword vectors indicates a meaning of a respective keyword based on a frequency at which other words surround the respective keyword, and wherein a dot product between two keyword vectors of the plurality of keyword vectors indicates a level of similarity between respective keywords of the two keyword vectors;
determining a respective dot product for each keyword vector of the plurality of keyword vectors and each of the remaining keyword vectors of the plurality of keyword vectors;
compare the respective dot product for each keyword vector of the plurality of keyword vectors to a threshold value;
in response to determining which of the respective dot products exceeds the threshold value, determine a subject matter vector based on the keyword vectors with the respective dot products that exceed the threshold value, wherein the subject matter vector indicates keywords corresponding to the subject matter;
compare the subject matter vector to an attribute vector to determine whether the subject matter vector and the attribute vector correspond, wherein the attribute vector includes a plurality of vectors associated with a selected attribute, and wherein the selected attribute is a characteristic of the media asset used to distinguish the media asset from other media assets;
in response to determining that the subject matter vector and the attribute vector correspond, tag the selected media asset record with the selected attribute in the first database;
receive a user request for media assets corresponding to the selected attribute; and
generate for display a listing for the selected media asset record based on the tagging.

11. The system of claim 10, wherein each of the keywords in the plurality of keywords is identified from subtitle data or descriptive textual data associated with the media asset.

12. The system of claim 10, wherein the control circuitry is further configured to:
associate a keyword vector weight with each of the two keyword vectors based on a keyword weight corresponding to the respective keywords; and
determine the subject matter vector based on the keyword vector weight associated with each of the two keyword vectors.

13. The system of claim 10, wherein a weight associated with each of the plurality of vectors associated with the selected attribute is used to determine whether the subject matter vector and the attribute vector correspond.

14. The system of claim 10, wherein the control circuitry configured to compare the respective dot product for each keyword vector of the plurality of keyword vectors to a threshold value is further configured to:
determine a first dot product of a first keyword vector of the plurality of keyword vectors and a second keyword vector of the plurality of keyword vectors;
retrieve a first threshold value from the second database; and
compare the first dot product to the first threshold value.

15. The system of claim 10, wherein the attribute vector includes a plurality of values associated with a selected attribute, and wherein the control circuitry configured to compare the subject matter vector to an attribute vector to determine whether the subject matter vector and the attribute vector correspond is further configured to:
determine a second dot product of the subject matter vector and the attribute vector;
retrieve a second threshold value from the second database; and
compare the second dot product to the second threshold value.

16. The system of claim 10, wherein the selected attribute is a genre.

17. The system of claim 10, wherein the control circuitry is further configured to weight the subject matter vector based on a number of keyword vectors of the plurality of keyword vectors that correspond to the subject matter vector.

18. The system of claim 17, wherein the control circuitry is further configured to determine whether to compare the subject matter vector to the attribute vector based on a weight corresponding to the subject matter vector.

* * * * *